(12) United States Patent
Lee et al.

(10) Patent No.: US 10,097,377 B2
(45) Date of Patent: Oct. 9, 2018

(54) SYSTEM AND METHOD OF SHARING CONTENTS USING MESSENGER

(71) Applicant: SAMSUNG ELECTRONICS CO., LTD., Suwon-si (KR)

(72) Inventors: Sang-kwon Lee, Suwon-si (KR); Hyok-sung Choi, Yongin-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 14/821,945

(22) Filed: Aug. 10, 2015

(65) Prior Publication Data

US 2015/0350124 A1  Dec. 3, 2015

Related U.S. Application Data

(63) Continuation of application No. 12/482,958, filed on Jun. 11, 2009, now Pat. No. 9,106,448, which is a continuation of application No. 11/783,452, filed on Apr. 10, 2007.

(30) Foreign Application Priority Data

Oct. 24, 2006 (KR) .................. 10-2006-0103623

(51) Int. Cl.
    G06F 15/16      (2006.01)
    H04L 12/58      (2006.01)

(52) U.S. Cl.
    CPC ............ H04L 12/581 (2013.01); H04L 51/04 (2013.01); H04L 51/10 (2013.01)

(58) Field of Classification Search
    CPC ................... H04L 12/58; H04L 51/10

USPC .................................................. 709/206, 207
See application file for complete search history.

(56) References Cited

U.S. PATENT DOCUMENTS

| 7,308,261 B2 | 12/2007 | Henderson et al. |
| 2003/0140103 A1 | 7/2003 | Szeto et al. |
| 2003/0149573 A1 | 8/2003 | Lynton |
| 2003/0233424 A1* | 12/2003 | Seo ......................... G08C 17/02 709/217 |
| 2004/0103153 A1* | 5/2004 | Chang ................. H04L 12/2803 709/206 |

(Continued)

FOREIGN PATENT DOCUMENTS

| CN | 1452746 A | 10/2003 |
| CN | 1684422 A | 10/2005 |

(Continued)

OTHER PUBLICATIONS

First Office Action dated Aug. 26, 2010 in counterpart Chinese Application No. 200710167146.5.

*Primary Examiner* — Karen Tang
(74) *Attorney, Agent, or Firm* — Sughrue Mion, PLLC

(57) ABSTRACT

The present invention provides to a system and method of sharing contents using a messenger program. The system includes a device server which registers Consumer electronic (CE) devices of the same user and CE devices of different users, and generates a messenger account; a messenger server which registers the generated messenger account; and a buddy setting module which sets a buddy relationship among the CE devices of the same user and a buddy relationship among the CE devices of different users, such that contents are shared by the CE devices having the buddy relationship.

4 Claims, 8 Drawing Sheets

(56) References Cited

U.S. PATENT DOCUMENTS

| | | | |
|---|---|---|---|
| 2004/0122901 A1* | 6/2004 | Sylvain | H04L 29/06 709/206 |
| 2004/0240642 A1* | 12/2004 | Crandell | H04M 7/128 379/88.22 |
| 2005/0038856 A1 | 2/2005 | Krishnasamy et al. | |
| 2005/0071361 A1 | 3/2005 | Hettish et al. | |
| 2005/0108346 A1 | 5/2005 | Malik | |
| 2005/0227676 A1 | 10/2005 | De Vries | |
| 2006/0010203 A1 | 1/2006 | Mrsic-Flogel et al. | |
| 2006/0036689 A1* | 2/2006 | Buford | H04L 51/04 709/206 |
| 2006/0142880 A1* | 6/2006 | Deen | G05B 15/02 700/19 |
| 2007/0003029 A1* | 1/2007 | Vesterinen | G06Q 10/107 379/88.14 |
| 2007/0067396 A1 | 3/2007 | Blinn et al. | |
| 2007/0078938 A1 | 4/2007 | Hu et al. | |
| 2007/0281703 A1 | 12/2007 | Shkedi | |
| 2008/0027909 A1 | 1/2008 | Gang et al. | |
| 2008/0051064 A1 | 2/2008 | Jones et al. | |
| 2008/0098076 A1 | 4/2008 | Lee et al. | |
| 2009/0016499 A1 | 1/2009 | Hullfish et al. | |
| 2009/0016510 A1 | 1/2009 | Becker et al. | |
| 2009/0164235 A1 | 6/2009 | Malik | |
| 2010/0169217 A1 | 7/2010 | Kuhn et al. | |
| 2014/0012935 A1 | 1/2014 | Wu et al. | |

FOREIGN PATENT DOCUMENTS

| | | |
|---|---|---|
| EP | 1 587 239 A1 | 10/2005 |
| JP | 2005-57708 A | 3/2005 |
| KR | 10-2004-0007857 A | 1/2004 |
| KR | 10-2006-0012191 A | 2/2006 |
| WO | 01/86469 A1 | 11/2001 |
| WO | 2004/04046874 A2 | 6/2004 |

\* cited by examiner

SYSTEM AND METHOD OF SHARING CONTENTS USING MESSENGER

CROSS REFERENCE TO RELATED APPLICATION

This is a Continuation of U.S. application Ser. No. 12/482,958 filed Jun. 11, 2009, which is a Divisional of U.S. application Ser. No. 11/783,452 filed Apr. 10, 2007, which claim priority from Korean Patent Application No. 10-2006-103623 filed on Oct. 24, 2006 in the Korean Intellectual Property Office, the disclosure of which is incorporated herein by reference in its entirety.

BACKGROUND OF THE INVENTION

1. Field of the Invention

Apparatuses and methods consistent with the present invention relate to a system and method of sharing contents using a messenger program, and more particularly, to a system and method of sharing contents using a messenger program that registers CE devices of the same user or CE devices of different users in a device server so as to register messenger accounts to be generated by the device server and sets a buddy relationship among the CE devices of the same user and a buddy relationship among the CE devices of different users so as to share contents among the CE devices having the buddy relationship.

2. Description of the Related Art

A messenger program is software that allows messages and data to be exchanged among a plurality of users through the Internet in real time. The messenger program is generally referred to as an instant messenger program because it can instantly transmit messages and data. The user can check if other users have accessed the Internet through the messenger program and respond to the other users instantly.

Further, the messenger program has a faster response speed than general e-mail and permits the user to exchange messages while performing other jobs. The messenger program supports multi-user chatting, voice chatting, and the like, and thus, a large volume of motion picture files, text messages, and the like can be transmitted to a cellular phone through the messenger program. Further, news, stocks, music information, and the like are provided by the messenger program.

FIG. 1 is a diagram showing a data transmission system that uses a messenger service according to the related art.

The data transmission system that uses the messenger service according to the related art includes a mobile terminal 100, a host computer 130, an image forming device 150, and a messenger server 160.

The mobile terminal 100, the messenger server 160, and the host computer 130 perform a messenger service through a mobile communication network (not shown) and an Internet network (not shown).

The mobile terminal 100, such as a personal digital assistant (PDA), a cellular phone, a personal communication service (PCS), and the like, is a device that secures portability. The mobile terminal 100 can perform communication with external devices in a wired/wireless manner, stores a plurality of data files, and has a function of capturing a still picture or a motion picture using an internal camera. Further, the mobile terminal 100 has a Short Message Service (SMS) function and a function of transmitting the stored files to an external device, such as the host computer 130. The stored data files may be, for example, still picture files, motion picture files, general document files, Portable Document Format (PDF) files, and the like.

The mobile terminal 100 has a function of transmitting a predetermined data file to the host computer 130 using a messenger service. In particular, when an instant messenger Identifier (ID) is input or selected to transmit a data file through a user interface, the mobile terminal 100 requests that the messenger server 160 authenticate the input ID.

Here, a messenger service, which is implemented by an instant messenger program 135, provides bidirectional communication in which messages are exchanged in a real time manner when a user and another user are connected to Internet.

The user downloads the instant messenger program 135 from the messenger server 160 that is a service provider and installs the downloaded instant messenger program 135 in the host computer 130. Then, in order to use the instant messenger program 135, the user joins the messenger server 160. That is, the user registers an ID, a password, and the like with the messenger server 160 for joining.

When the user tries to access the messenger server 160 using the instant messenger program 135 of the host computer 130, the user logs on the messenger server 160 by inputting the ID and the password registered upon joining. At this time, the instant messenger program 135 checks a fixed Internet Protocol (IP) or a floating IP of the host computer 130 in which the user tries to log on the messenger program and informs the messenger server 160 of the checked fixed IP or floating IP. Then, the messenger server 160 stores, in a database, an IP that matches with the logon ID.

To this end, the mobile terminal 100 includes a user input unit 105, a display unit 110, a control unit 125, a communication unit 120, and a storage unit 115.

The user input unit 105 is a user interface through which the user inputs an ID of the instant messenger program so as to transmit data files.

The display unit 110, which is implemented by an LCD, displays the instant messenger ID input through the user input unit 105. The storage unit 115 stores a plurality of data files.

The communication unit 120 transmits the ID input through the user input unit 105 to the messenger server 160. Further, the communication unit 120 receives an IP matching with the ID transmitted from the messenger server 160.

The control unit 125 transmits the ID input to the messenger server 160 through the user input unit 105 and controls the communication unit 120 so as to request the authentication of the ID and the search of the corresponding IP. Further, the control unit 125 controls the communication unit 120 to transmit the data files stored in the storage unit 115 to the host computer 130 corresponding to the IP searched and transmitted by the messenger server 160.

Meanwhile, the messenger server 160 stores the IDs and passwords of the plurality of users who use the instant messenger program 135. Further, the messenger server 160 also stores an IP of a computer that is used by the user whenever logon.

When the mobile terminal 100 requests the authentication of an ID, the messenger server 160 checks whether or not the requested ID is available. If the ID is available, the messenger server 160 searches an IP matching with the requested ID and transmits the searched IP to the mobile terminal 100.

The messenger server 160 checks whether or not the ID to be authenticated is joined in the messenger server 160. If the ID is joined in the messenger server 160, the messenger server 160 checks whether or not the ID to be authenticated is currently logged on. If it is checked that the ID is currently logged on, the messenger server 160 judges that the ID to be authenticated is an available ID and searches an IP of the host computer 130 that matches with the ID to be authenticated.

Then, the messenger server 160 encodes the searched IP for the authentication and transmits the encoded IP to the mobile terminal 100. At this time, the IP is encoded according to a prescribed protocol between the mobile terminal 100 and the messenger server 160. Further, the messenger server 160 may transmit the searched IP without encoding.

The mobile terminal 100 decodes the encoded IP transmitted from the messenger server 160, performs the authentication, and transmits a desired data file to the host computer 130 corresponding to the transmitted IP. The data file to be transmitted can be selected before the mobile terminal 100 requests the messenger server 160 for the authentication of the ID or after the mobile terminal 100 receives the IP. Further, the data file to be transmitted includes various files, such as text files, image files, and the like.

The user logs on the messenger server 160 using the fixed IP or the floating IP through the host computer 130 that receives the data file transmitted from the mobile terminal 100 and performs a predetermined job.

To this end, the instant messenger program 135 and a data processing module 140 are installed in the host computer 130.

The instant messenger program 135 is a program that provides the above-described instant messenger service. The user joins and logs on the messenger server 160 using the instant messenger program 135.

Further, the data processing module 140 judges a characteristic of the data file transmitted from the mobile terminal 100 and performs a predetermined job on the basis of the judgment result. Specifically, if the transmitted data file has an extension "txt" and does not exceed a predetermined capacity, the data processing module 140 judges that the transmitted data file is a short message using an SMS (Short Message Service). Then, the data processing module 140 processes the message to be displayed on a screen of the host computer 130.

Further, if the transmitted data file has an extension other than "txt", the data processing module 140 prints the transmitted data file or outputs the transmitted data file to an image forming device 150 to transmit to a facsimile or a receiver.

At this time, the data processing module 140 checks priorities given to a printing job and a facsimile job, such that the image forming device 150 performs a job having a higher priority. For example, if the printing job has a higher priority, the data processing module 140 outputs a command to print the transmitted data file to the image forming device 150 together with the transmitted data file. Then, the image forming device 150 performs the printing job relative to the data file. Here, the priorities given to the printing job and the facsimile job may be changed by the user.

The image forming device 150 is an office automation apparatus, such as a complex machine, a printer, or a facsimile, and forms an image of the data file output from the host computer 130. The host computer 130 is communicatably connected to the image forming device 150 using a communication interface, such as a USB interface or the like.

FIG. 2 is a flow chart showing data transmission according to the related art.

The mobile terminal 100 requests the messenger server 160 for the authentication of the instant messenger ID input through the user interface (Step S200).

When the mobile terminal 100 requests the authentication of the predetermined ID, the messenger server 160 checks whether or not the requested ID is registered in the messenger server 160 (Step S205). As the check result, if the ID is registered, the messenger server 160 checks whether or not the ID to be authenticated is currently logged on (Step S210).

At Step S210 of checking whether or not the messenger ID is logged on, if it is checked that the ID to be authenticated is currently logged on, the messenger server 160 searches and encodes the IP of the host computer 130 that matches with the ID to be authenticated and stored, and transmits the encoded IP to the mobile terminal 100 (Step S215).

If Step S215 of transmitting the IP to the mobile terminal 100 is completed, the mobile terminal 100 decodes the encoded IP transmitted from the messenger server 160 to perform the authentication, and transmits a desired data file to the host computer 130 corresponding to the transmitted IP (Step S220).

Next, the data processing module 140 of the host computer 130 judges the characteristic of the data file transmitted from the mobile terminal 100 (Step S225).

As the judgment result of the characteristic, if the transmitted data file is judged as a short message, the data processing module 140 displays the short message on the screen of the host computer 130 (Step S235).

Meanwhile, with regard to the judgment result of the characteristic at Step S230, if it is judged that the transmitted data file is not the short message, the data processing module 140 outputs the transmitted data file to the image forming device 150 (Step S240). That is, the data processing module 140 judges that the transmitted data file is to be printed or transmitted to a receiving-side facsimile, and outputs the data file to the image forming device 150 together with a printing or facsimile job command.

When the data file is output to the image forming device 150, the image forming device 150 performs a job corresponding to the command output from the data processing module 140 relative to the data file transmitted from the host computer 130 (Step S245). For example, if the printing command is output at Step S240, the image forming device 150 allows the data file to be printed at Step S245.

Meanwhile, if it is checked that the ID to be authenticated is not registered in the messenger server 160 at Step S205, the messenger server 160 generates an error message to notify that the ID is not registered and transmits the error message to the mobile terminal 100 (Step S250).

Further, if it is checked that the ID to be authenticated is logged off at Step S210, the messenger server 160 generates an error message to notify that the ID is logged off and transmits the error message to the mobile terminal 100 (Step S250).

Meanwhile, in the above-described related art, even though the data file transmitted from the mobile terminal 100 is not the short message, the data processing module 140 can display the received data file on the screen of the host computer 130.

In the messenger service according to the related art described above, when an input device is applied to the mobile terminal 100 that is a consumer electronic (CE) device that is relatively limited compared with the host computer 130, there is difficulty associated with setting the messenger account. Further, there is a difficulty in searching users for a buddy request and setting the relationship, thereby causing a difficulty in setting the buddy relationship.

SUMMARY OF THE INVENTION

Exemplary embodiments of the present invention overcome the above disadvantages and other disadvantages not described above. Also, the present invention is not required to overcome the disadvantages described above, and an exemplary embodiment of the present invention may not overcome any of the problems described above. An aspect of the present invention is to provide a system and method of sharing contents using a messenger program that registers CE devices of the same user or different users in a device server so as to register messenger accounts generated through the registration of the CE devices in the device server and sets a buddy relationship among the CE devices of the same user and a buddy relationship among the CE devices of different users so as to share contents among the CE devices having the buddy relationship.

The various aspects of the present invention are not limited to those mentioned above, and other features and aspects of the present invention will be understood by those skilled in the art in view of the following description.

According to an aspect of the present invention, there is provided a system for sharing contents using a messenger program, the system including an account generation module which registers a CE device on the basis of device information transmitted from the CE device so as to generate a messenger account, a buddy setting module which sets a buddy relationship using a messenger client on the basis of the messenger account registered in a messenger server, a storage module which stores the device information, the messenger account, and the buddy relationship, and a communication module which provides the messenger account registered in the messenger server to the CE device.

According to another aspect of the present invention, there is provided a system for sharing contents using a messenger program, the system including a storage module which stores device information to be provided to a device server and a messenger account that is generated on the basis of the device information and registered in a messenger server, a display module which displays a content list and a buddy list, in which a buddy relationship is set, using the messenger account, and a control module, in response to contents being requested using the list displayed on the display module, allowing the contents to be provided.

According to another aspect of the present invention, there is provided a system for sharing contents using a messenger program, the system including a server module which registers a messenger account according to a messenger account registration request generated in a device server, and a communication module which provides acceptance or rejection of the request, in response to a request for a buddy relationship on the basis of the registered messenger account.

According to another aspect of the present invention, there is provided a method of registering a CE device using a device server, the method including receiving device information of a CE device connected to a device server, registering the CE device on the basis of the device information to generate a messenger account, requesting registration of the generated messenger account in a messenger server using a messenger client of the device server, and providing the messenger account to be registered according to the request to the CE device.

According to another aspect of the present invention, there is provided a method of sharing contents using a messenger program, the method including selecting a buddy relationship setting method according to a request for a buddy relationship among CE devices, searching a messenger account corresponding to the selected setting method, requesting for a buddy relationship of the CE devices including the messenger account on the basis of the search result, and sharing contents among the CE devices having the buddy relationship according to the request.

BRIEF DESCRIPTION OF THE DRAWINGS

The above and other features and aspects of the present invention will become more apparent by describing in detail exemplary embodiments thereof with reference to the attached drawings in which.

DESCRIPTION OF THE EXEMPLARY EMBODIMENTS

Figure 1:
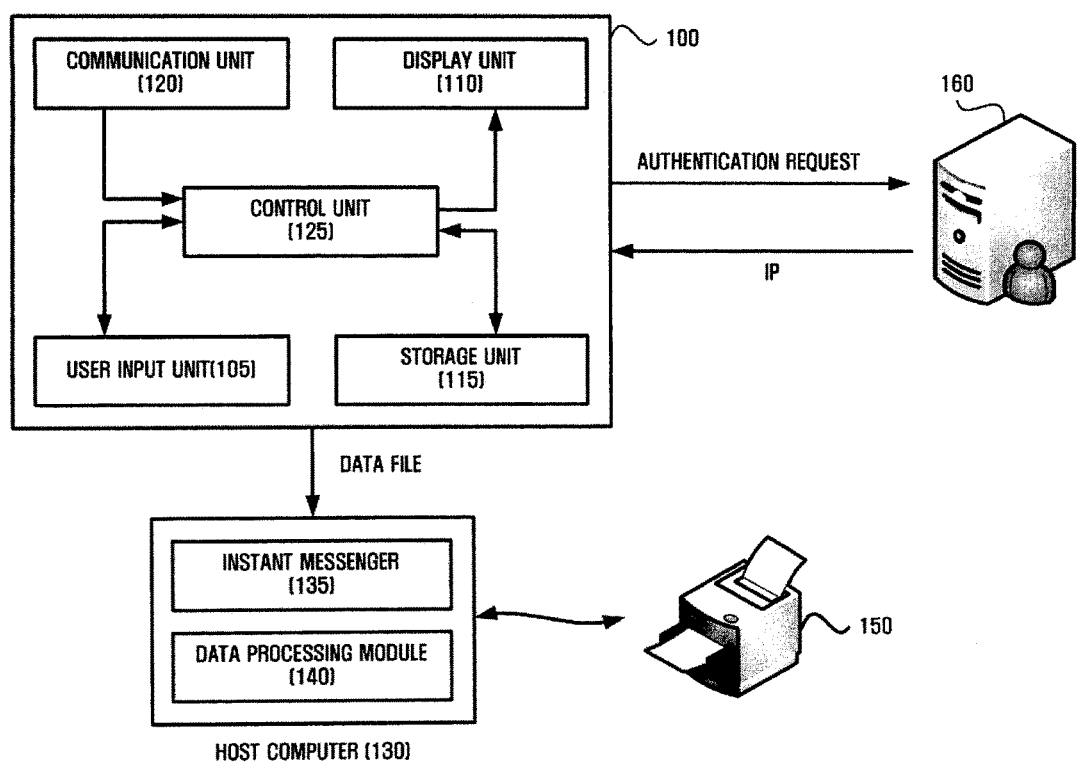
FIG. 1 is a diagram showing a data transmission system using a messenger service according to the related art.
Figure 2:
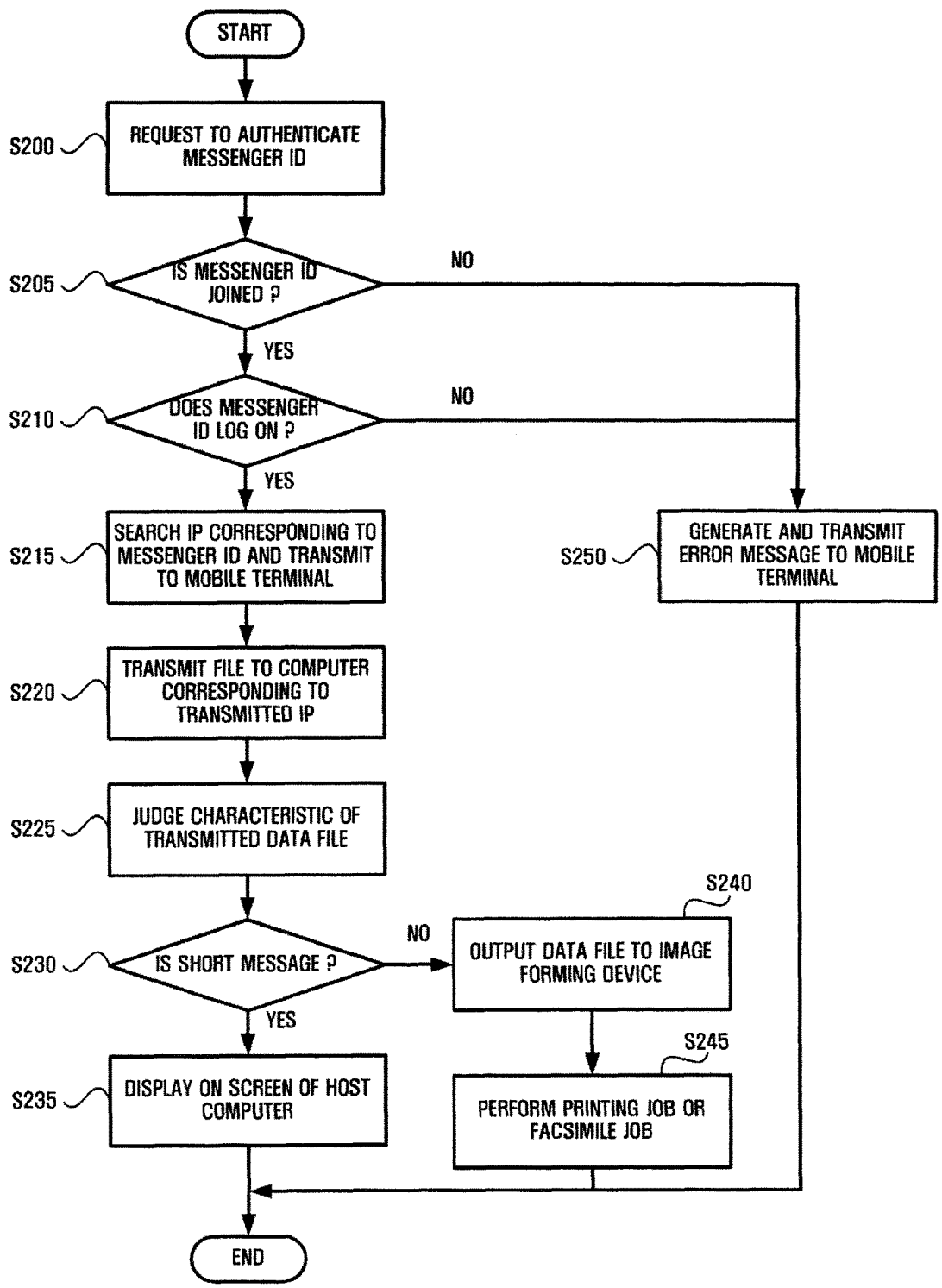
FIG. 2 is a flowchart showing data transmission according to the related art.

Features and aspects of the present invention and methods of accomplishing the same may be understood more readily by reference to the following detailed description of exemplary embodiments and the accompanying drawings. The present invention may, however, be embodied in many different forms and should not be construed as being limited to the exemplary embodiments set forth herein. Rather, these exemplary embodiments are provided so that this disclosure will be thorough and complete and will fully convey the concept of the present invention to those skilled in the art, and the present invention will only be defined by the appended claims. Like reference numerals refer to like elements throughout the specification.

Figure 3:
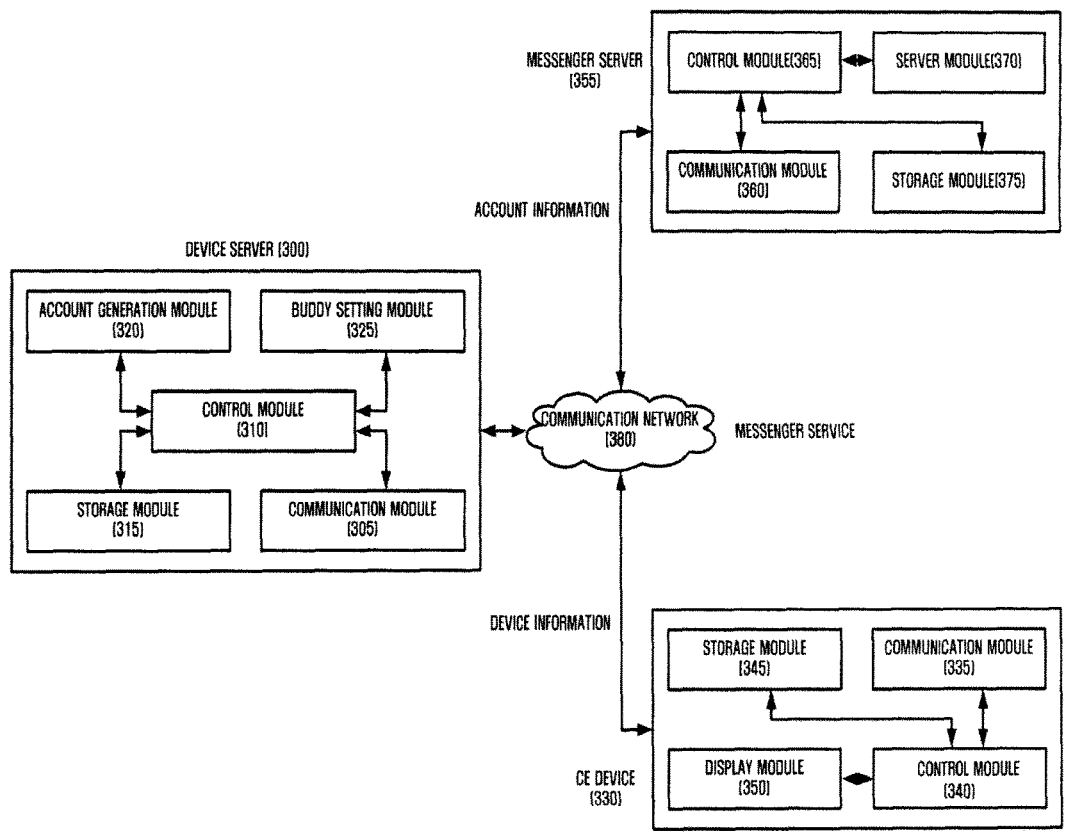
FIG. 3 is a diagram showing a system for sharing contents using a messenger program according to an exemplary embodiment of the present invention.

FIG. 3 is a diagram showing a system for sharing contents using a messenger program according to an exemplary embodiment of the present invention.

The system for sharing contents using a messenger program according to this exemplary embodiment connects a device server 300, a CE device 330, and a messenger server 355 through a communication network 380, sets a buddy relationship among different CE devices 330 of the same user (not shown) and a buddy relationship among different CE devices 330 of different users, and transmits and receives a file by sharing contents among the CE devices 330 of the users.

In this exemplary embodiment, different users may be users who have CE devices 330 having the same messenger client or users who have different CE devices 330 having different messenger clients.

First, the device server 300 is a server that receives, from the CE device 330 of the user, device information of the corresponding device, registers the device, and generates a messenger account.

As shown in FIG. 3, the device server 300 includes a communication module 305, a control module 310, a storage module 315, an account setting module 320, and a buddy setting module 325. The device server 300, including the above-described components, is connected to the CE device 330 and the messenger server 355 through the communication network 380.

Here, the communication network 380 may be a wired or wireless Internet network but it is not limited thereto. For example, in a case where the CE device 330 of the user is a cellular phone, the communication network 380 may be CDMA, W-CDMA, or Power Line Communication (PLC) using a power line.

That is, the communication network 380 may vary depending on the CE device 330 of the user.

The communication module 305 receives the device information of the CE device 330 through the communication network 380. Further, when registration of an account generated by the account generation module 320 is requested, the communication module 305 receives a response relative to the account registration from the messenger server 355 and transmits account information to be registered in the messenger server 355 to the CE device 330.

The control module 310 controls the individual modules in the device server 300. When the device information is provided from the CE device 330, the control module 310 transmits the corresponding device information to the account generation module 320 and provides a messenger account generated by the account generation module 320 to the messenger server 355. When the messenger server 355 completes the registration of the corresponding account, the messenger server 355 provides the registered messenger account information to the CE device 330.

Further, the control module 310 generates a serial number request command for obtaining the device information of the CE device 330 and controls the device server 300 to set the buddy relationship or the execution or end of the messenger client of the CE device 330. In addition, the control module 310 controls a content list and a device list provided by setting the buddy relationship among the buddies of CE devices 330 and sharing of contents selected by the user on the basis of the content list and the device list.

The storage module 315 stores the device information provided from the CE device 330, the messenger account information generated by the account generation module 320, the buddy relationship information set by the buddy setting module 325. The storage module 315 also stores a messenger client program for using the messenger service.

At this time, a plurality of messenger client programs may be stored and provided to the CE devices 330 having different messenger clients.

The account generation module 320 registers the CE device 330 on the basis of the device information received through the communication module 305 and generates the messenger account on the basis of the device information. When the messenger account is generated, the user may set user information for identifying the CE device 330, for example, a user-defined device name or a user name. The user information may be used as identification information relative to a user and a device having the buddy relationship.

The messenger server 355 is requested to register the messenger account generated by the account generation module 320 and the corresponding account is registered according to the request.

If the messenger account is registered in the messenger server 355, the buddy relationship among the CE devices 330 of different users who use a web service and the buddy relationship among the CE devices 330 of the same user are set by the buddy setting module 325 on the basis of the corresponding account.

The device information for the device registration and the generation of the messenger account may be the serial number of the CE device 330. That is, if the serial number is received, the account generation module 320 generates a messenger ID, a password, user setting information, for example, the messenger account including the user-defined device name and user name using the corresponding serial number.

The messenger account may be used to set the buddy relationship among the CE devices 330 of the same user and may be used to set the buddy relationship among CE devices 330 of different users using the user information.

The generation of the messenger account and the device registration will be described in detail with reference to FIG. 6.

The buddy setting module 325 registers the messenger account generated according to the registration of the CE device 330 by the account generation module 320 in the messenger server 355 and sets the buddy relationship among the CE devices 330 using the messenger account registered in the messenger server 355.

The buddy relationship set by the buddy setting module 325 is set on the basis of the messenger account registered in the messenger server 355 using the messenger client stored in the storage module 315. The buddy relationship includes the buddy relationship among the CE devices of the same user and the buddy relationship among the CE devices of different users.

The buddy relationship among the CE devices 330 of the same user is based on the pre-registered messenger accounts of the CE devices 330. Further, the buddy relationship among the CE devices of different users is based on information of the users who use the messenger service through the web service.

When a device requests another device for a buddy relationship on the basis of the messenger account to be registered in the messenger server 355, a messenger client is executed to request the messenger server 355 for the buddy relationship. Then, when another device informs that the request is accepted, the above-described buddy relationship is set.

As described above, if the buddy relationship is set, the CE device 330 displays a list of the CE devices 330 of the same user, a list of the CE devices 330 of different users, and a content list selected by the user through a display module 350.

The CE device 330 may include a communication module 335 that performs communication between the above-described device server 300 and the messenger server 355, a control module 340, a storage module 345, and a display module 350.

The CE device 330 may include a portable device, such as a PDA, a notebook computer, a cellular phone, or the like.

Further, the CE device 330 may include all devices, such as a PC, which has limited portability but can be connected to the corresponding device so as to use an Internet service.

According to the kinds of CE devices 330, there may be different access methods to the device server 300.

For example, in a case where the CE device 330 of the user is a PDA or a notebook computer, the device information is provided when the corresponding device is booted and accesses the device server 300 through the communication module 335. Meanwhile, in case of a device, such as a cellular phone, which is always turned on, the access to the device server 300 is made through a user input.

That is, the CE device 330 accesses the device server 300 through an automatic access upon booting of the corresponding device or a manual access by the user input. Further, the CE device 330 may access the messenger server 355 in the same manner.

The CE device 330 that accesses the device server 300 in such a manner provides the device information to the device server 300 through the communication module 335. If the messenger account generated when the device information is provided is registered in the messenger server 355, the CE device 330 receives and stores the corresponding messenger account.

The communication module 335 transmits and receives information about the request of the buddy relationship and acceptance/rejection of the buddy relationship, the contents or the content list of the CE device 330 having the buddy relationship, in addition to the above-described information.

When the contents is requested through the content list and the buddy list of the CE device 330 having the buddy relationship, the control module 340 controls to provide the contents or the content list stored in the storage module 345.

The storage module 345 stores the messenger client, the contents, and the messenger account for setting the buddy relationship and stores the content list stored in the corresponding device.

The display module 350 displays a user device list having the buddy relationship, a buddy device list of other users having the buddy relationship, and the content list for sharing the contents.

The messenger client of the CE device 330 may be incorporated into the corresponding device upon delivery from a warehouse. However, in a case where the messenger client is not incorporated into the corresponding device, the messenger client may be downloaded from the device server 300 so as to synchronize the messenger clients among the devices having different messenger client programs.

The messenger server 355 may provide a messenger service on the Internet. The messenger server 355 registers the messenger account generated by the device server 300, manages a buddy list, transmits chatting messages among the users, and relays file transmission. A general server, such as Jabber, MSN, Yahoo, Google, AOL, or the like, may be used.

The buddy list is used to set the buddy relationship among the messenger users by the messenger server 355. When the buddy relationship between the user and the CE device 330 is set, the user can determine the access state of another user. The buddy list is used to perform chatting and to share the files.

The messenger server 355 may include a communication module 360, a control module 365, a server module 370, and a storage module 375.

The communication module 360 receives a request to register the messenger account generated by the device server 300 and transmits acceptance/rejection of the request to the device server 300. Further, the communication module 360 receives a request to set the buddy relationship from the buddy setting module 325 and transmits acceptance/rejection of the request to the buddy setting module 325. In addition, the communication module 360 transmits and receives general information required for the messenger service.

The control module 365 transmits a messenger account registration request and a buddy relationship setting request to the server module 370 and controls the messenger server 355.

The server module 370 may include a dispatch server, a notification server, and a switchboard server.

Among these, the dispatch server is a module defined by an Internet draft Microsoft Network (MSN) messenger service 1.0 protocol (MSN 1999) of IETF (Internet Engineering Task Force). That is, the dispatch server refers to a server program that judges a normal user by a version check of a protocol when the messenger client is connected and a computer system on which the corresponding program operates.

The notification server refers to a server program that supports the messenger client so as to be continuously connected to the messenger service and on which a logon job is performed, and a computer system on which the corresponding program operates. The switchboard server refers to a server program that relays the transmission of the instant messages of the users and a computer system on which operates a corresponding program.

The messenger server 355 may transmit a short message according to whether or not different users who have the buddy relationship use the messenger service.

The sharing of the contents using a messenger function assumes that the CE device has access to the messenger server 355. Accordingly, since the contents of the CE devices 330 of the users who do not access the corresponding server cannot be shared, the short message is transmitted to the CE device 330 of a different user who has the buddy relationship but does not access the messenger server 355 so as to transmit an access request message for sharing the contents to the corresponding CE device 330.

That is, in the CE device 330 that receives the corresponding message, the messenger client is automatically performed or the access to the messenger server 355 is made, such that the contents can be shared.

The storage module 375 of the messenger server 355 is a storage medium that stores messenger account information and buddy relationship information.

The system for sharing contents including the device server 300, the CE device 330, and the messenger server 355 according to this exemplary embodiment is a system that sets the buddy relationship among the CE devices 330 or among the users by registering the corresponding device when the device information of the CE device 330 of the user is provided to the device server 300, generating the messenger account, and registering the generated messenger account in the messenger server 355 so as to provide the registered messenger account to the CE device 330.

When the buddy relationship is set, the user can receive contents in the CE device 330 of another user through his/her CE device 330 and can share contents among his/her different CE devices 330.

Figure 4:
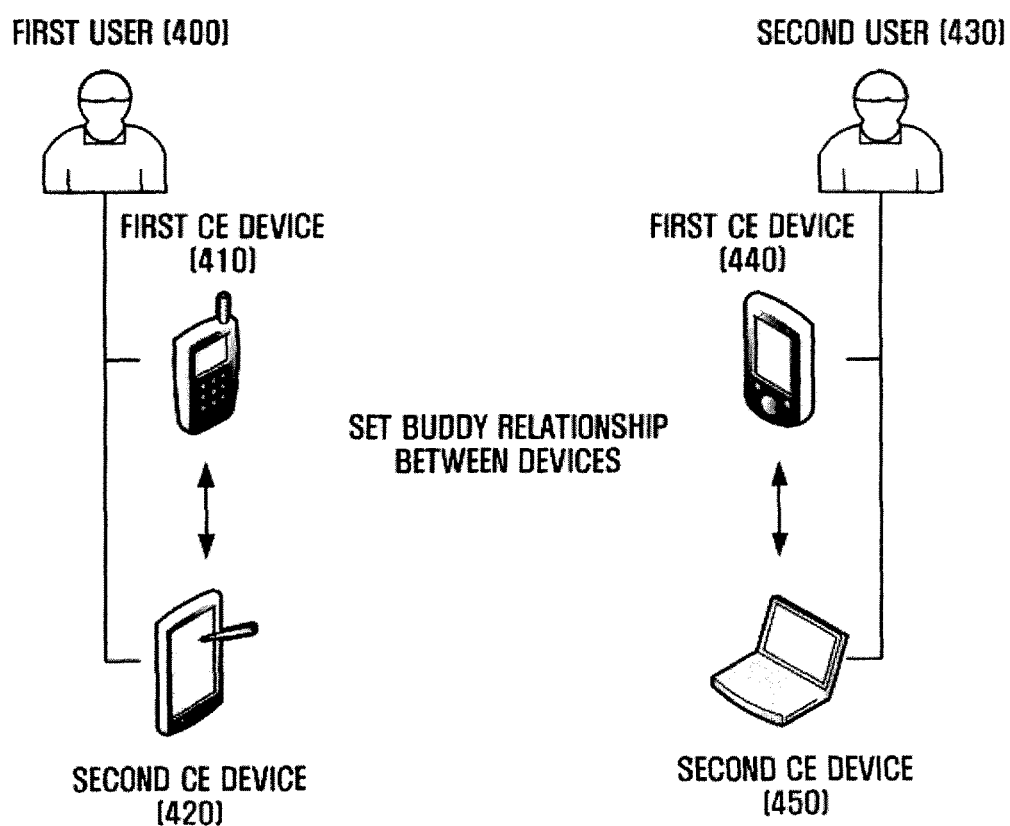
FIG. 4 is a diagram showing setting of a buddy relationship among CE (Consumer Electronic) devices of the same user according to a first embodiment of the present invention.

FIG. 4 is a diagram showing setting of a buddy relationship among the CE devices of the same user according to a first exemplary embodiment of the present invention.

According to this first exemplary embodiment, the buddy relationship among the CE devices of the same user is set so as to share contents by setting the buddy relationship using the messenger accounts of the plurality of CE devices 330 of the same user.

As shown in FIG. 4, a first user 400 may have first and second CE devices 410 and 420.

For example, if the first CE device 410 is pre-registered in the device server 300 and the second CE device 420 to be subsequently registered requests the first CE device 410 for a buddy relationship, the first CE device 410 judges whether to accept/reject the request. Then, the buddy relationship is set between the first and second CE devices 410 and 420.

First and second CE devices 440 and 450 of a second user 430 may have a buddy relationship in the same manner as in the first user 400. Therefore, the detailed description will be omitted.

Upon setting the buddy relationship among the devices of the same user, acceptance/rejection of the buddy relationship request is automatically performed using the messenger account. That is because information other than serial numbers of the messenger accounts stored in the CE devices 410, 420, 440, and 450 can be generated by the same user, for example, the first user 400 or the second user 430.

Figure 5:
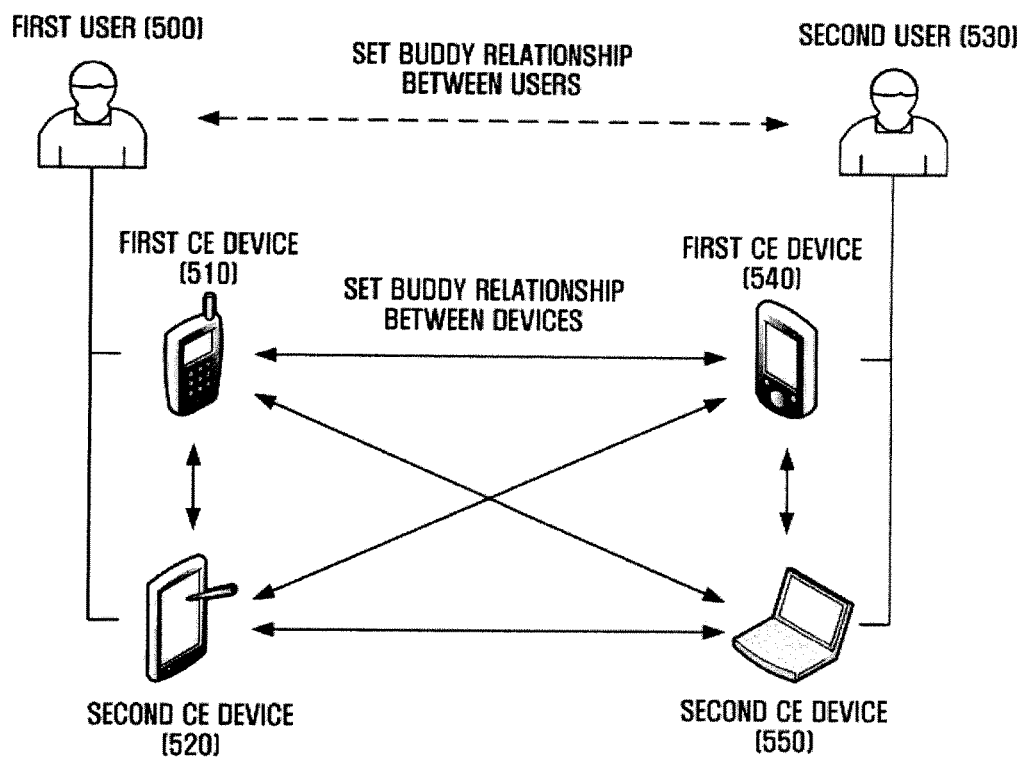
FIG. 5 is a diagram showing setting of a buddy relationship among CE devices of different users according to a second exemplary embodiment of the present invention.

FIG. 5 is a diagram showing setting of a buddy relationship among the CE devices of different users according to a second exemplary embodiment of the present invention.

According to the second exemplary embodiment, the buddy relationship among the CE devices 330 of different users is set so as to share contents among the CE devices 330 of the users.

Like the buddy relationship shown in FIG. 4, the setting of the buddy relationship according to this second exemplary embodiment assumes that first and second CE devices 510, 520, 540, and 550 of first and second users 500 and 530 are pre-registered in the device server 300. However, the buddy relationship is not set on the basis of the messenger accounts. In this case, the buddy relationship is set among web users.

When the first and second CE devices 510, 520, 540, and 550 of the first and second users 500 and 530 are registered, the buddy relationship among web users may be set on the basis of the user information, for example, the device name and the user name, through the input module (not shown) of the CE device 330 on the device server 300. However, the information used for setting the buddy relationship among the users is not limited thereto. The above-described device name and user name may be substituted with a unique number corresponding to the serial number of the CE device 330 to be transmitted to the device server 300 upon the registration of the device.

For example, if the second user 530 requests the first user 500 for the buddy relationship, the first user 500 responds whether to accept/reject the corresponding request. Then, the buddy relationship is set between the users. If the buddy relationship is set between the users, the buddy relationship is set among the first and second CE devices 510, 520, 540, and 550 of the users, such that the contents are shared by the corresponding devices.

Figure 6:
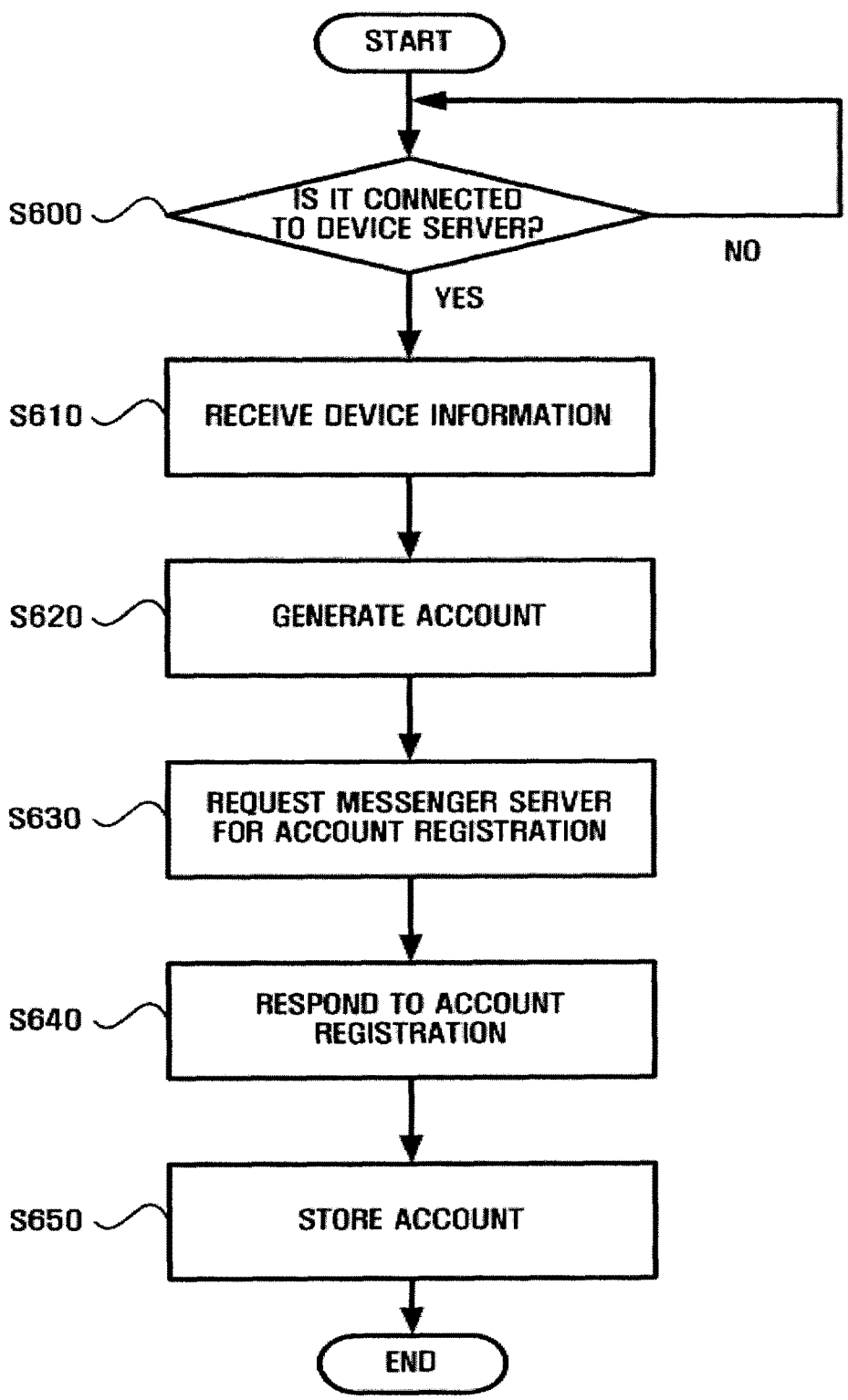
FIG. 6 is a flowchart showing a process of registering CE devices according to an exemplary embodiment of the present invention.

FIG. 6 is a flowchart showing a process of registering CE devices according to an exemplary embodiment of the present invention.

According to this exemplary embodiment, the device registration is performed by registering the devices in the device server 300 using the device information of the CE devices 330.

First, it is judged whether or not one or more CE devices 330 among the plurality of CE devices 330 of the users are connected to the device server 300 (operation S600).

If the CE devices 330 are connected to the device server 300, the device server 300 receives the device information from the CE devices 330 (operation S610).

The received device information may be the serial numbers used to register the devices or to generate the account, or may be content information used to construct the content list.

The device server 300 that receives the device information uses the serial numbers to generate the messenger accounts with the messenger ID, the password, the user-defined device name and the user name (operation S620), and executes the messenger client to request the messenger server 355 for account registration (operation S630).

Each of the accounts generated by the device server 300 become unique information as identification information relative to the corresponding user and the CE device 330 when using the messenger service.

The device server 300 executes the messenger client to request the messenger server 355 for the account registration. With the request for the account registration, if a response relative to the registration is received from the messenger server 355 (operation S640), the messenger client that is being executing on the device server 300 ends.

The device server 300 stores the accounts registered in the messenger server 355 in the storage module 315 and transmits the accounts to the CE devices 330 through the communication module 305.

The CE device 330 that receives the registered messenger account automatically stores the corresponding account (operation S650). Thereafter, the process of registering the CE device 330 is completed.

The process of registering other CE devices 330 of the user is performed in the same manner as the above-described process. In order to judge whether or not different CE devices 330 are owned by the same user, a process of searching the user and the pre-registered messenger account of the CE device 330 may also be included.

Through the above-described process of registering devices, the user executes the messenger client of the CE device 330 to request for setting the buddy relationship for contents sharing. If the buddy relationship is set, the contents of the CE devices 330 may be shared.

Figure 7:
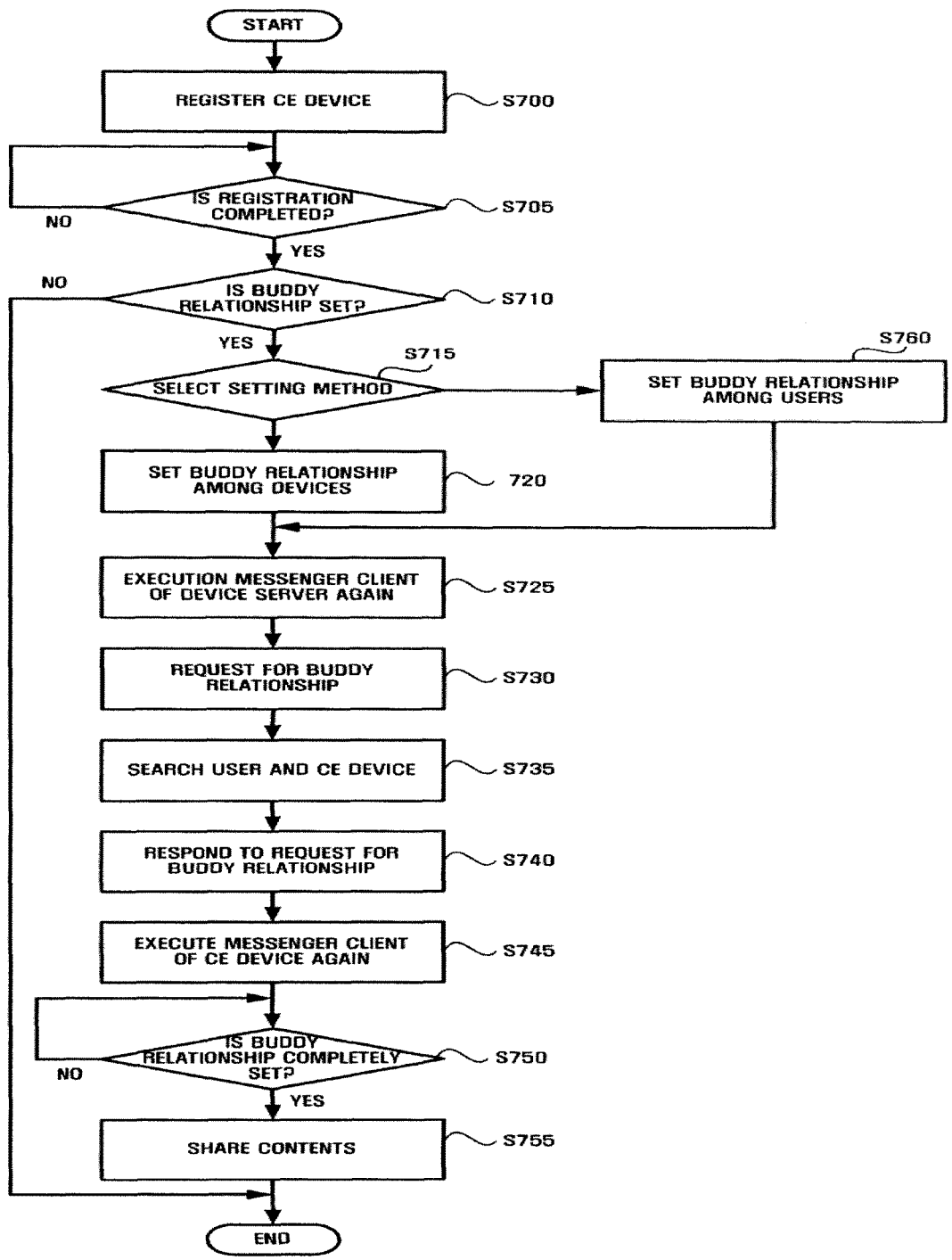
FIG. 7 is a flowchart showing a process of sharing contents using a messenger program according to an exemplary embodiment of the present invention.

FIG. 7 is a flowchart showing a process of sharing contents using a messenger program according to an exemplary embodiment of the present invention.

The buddy relationship according to the embodiment of the present invention represents contents sharing through the setting of the buddy relationship among the CE devices 330 of the same user or the buddy relationship among the CE devices 330 of different users using the above-described process of registering devices shown in FIG. 6.

First, the user registers the CE device 330 in the device server 300 (operation S700). When the registration of the corresponding device is completed (operation S705), it is judge whether or not the buddy relationship is set (operation S710).

In order to set the buddy relationship, the user selects a buddy relationship setting method (operation S715).

The reason why the user selects the buddy relationship setting method is that the buddy relationship can be set by at least one of a method of setting the buddy relationship among different CE devices 330 of the same user (operation S720) and a method of setting the buddy relationship among the CE devices 330 of different users (operation S760).

If the method of setting the buddy relationship among the devices of the same user is selected as the buddy relationship setting method (operation S720), the device server 300 ends the messenger client that is being executed on the CE device 330. Then, the device server 300 executes the messenger client of the device server 300 using the messenger account of the CE device 330 (operation S725).

If two CE devices 330 of the same user log on using, for example, an ID 1 and an ID 2 and the ID 2 requests the ID 1 for the buddy relationship, the device server 300 requests the messenger server 355 for the buddy relationship using the internal messenger client of the corresponding server (operation S730).

When the buddy relationship is requested from the messenger server 355 (Step S730), a user account and a messenger account of the CE device 330 that logs on using the ID 1 are searched (operation S735).

The user and the CE device 330 are searched using information, such as messenger account information, the user-defined device name, and the user name generated and registered in the device server 300.

If the user and the CE device 330 corresponding to the ID 1 are searched (operation S735), the ID 2 receives a response to the request to the buddy relationship from the ID 1 by the messenger server 355 (operation S740).

When the response indicates acceptance of the buddy relationship, the device server 300 ends the messenger client of the device server 300 on which the CE devices 330 log-on using the ID 1 and the ID 2, and requests different CE devices 330 of the same user having the messenger accounts of the ID 1 and the ID 2 to perform the messenger client again. If the messenger clients of the CE devices 330 are performed again according to the request of the device server 300 (operation S745), it is judged whether or not the buddy relationship relative to the CE devices 330 of the same user is completely set (operation S750).

If the buddy relationship is completely set, the content list is displayed on the screen of the CE device 330 using the content information of the corresponding device, such that the contents are shared (operation S755).

In the process of sharing content in operation S755, when the contents selected by the user through the content list displayed on the CE device 330 are requested and accepted, the corresponding contents are transmitted. Therefore, the contents are shared among the CE devices 330.

Meanwhile, the process of setting the buddy relationship among the users in operation S760 is similar to the operation of performing the messenger client again in operation S725 through the operation of sharing the contents in operation S755. However, the process of searching the accounts in operation S735 may be different. Here, the process of searching may be a process of searching the user-defined device name and user name, and the unique number corresponding to the serial number of the corresponding device upon the registration of the CE device 330.

Figure 8:
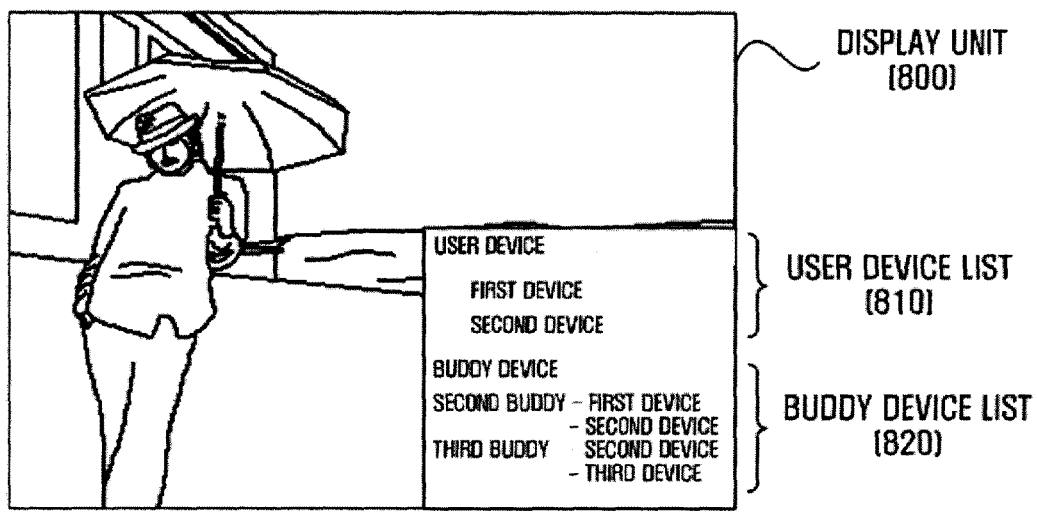
FIG. 8 is a diagram showing a screen for content sharing according to an exemplary embodiment of the present invention.
Figure 8:
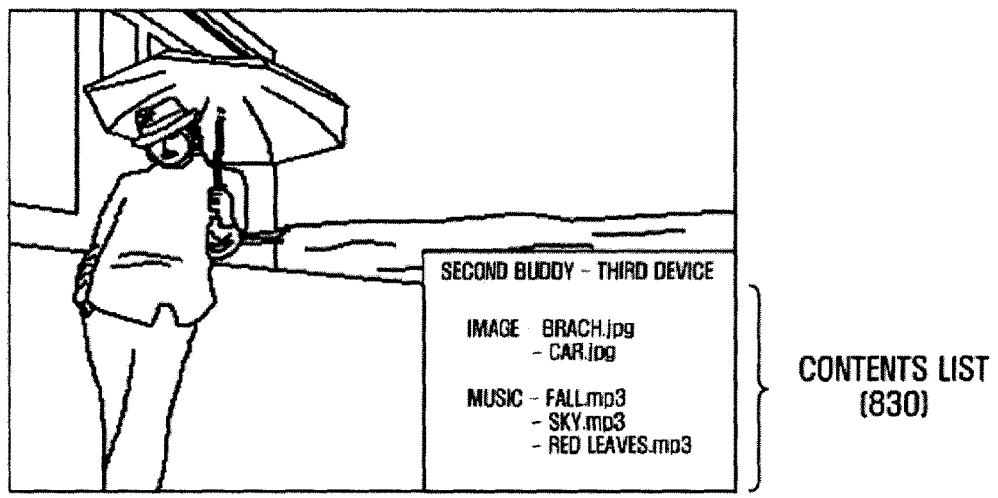

FIG. 8 is a diagram showing a screen for contents sharing according to an exemplary embodiment of the present invention.

On the screen for contents sharing according to this exemplary embodiment, information displayed on the CE device 330 using contents sharing is shown.

First, on the display module 350 of the CE device 330 that may be owned by the user, a user device list 810 relative to the CE devices 330 of the user and a buddy device list 820 in which the buddy relationship is set among different users may be displayed.

Here, the user device list 810 is a list of devices of the same user who has the buddy relationship using the messenger account and the buddy device list 820 is a list in which the buddy relationship is set among different users.

That is, the user may select his/her CE device 330 from the user device list 810 so as to receive a content list 830 relative to the contents stored in the corresponding device and receive device information of the CE device 330 and the content list 830 of another user using the buddy device list 820.

The user who receives the user device list 810, the buddy device list 820, and the content list 830 selects a desired content and requests the content on the basis of the corresponding list. If the CE device 330 that receives the contents request accepts the request, the corresponding contents are transmitted to the device that requests the contents, such that the contents are shared between the CE devices 330.

On the screen for contents sharing between the CE devices 330 having the buddy relationship, examples of the user device list 810, the buddy device list 820, and the content list 830 are shown. However, the screen for contents sharing of the CE device 330 of the user is not limited thereto.

Although the invention has been described in connection with the exemplary embodiments of the invention, it will be apparent to those skilled in the art that various modifications and changes may be made thereto without departing from the scope and spirit of the invention. Therefore, it should be understood that the above embodiments are not limitative, but illustrative in all aspects. The scope of the invention is defined by the appended claims rather than by the description preceding them, and all changes and modifications that fall within metes and bounds of the claims, or equivalents of such metes and bounds are therefore intended to be embraced by the claims.

According to the system and method of sharing contents using a messenger program according to an embodiment of the present invention, an input procedure by the user relative to predetermined information to use the messenger service may be minimized in the CE device having a limited input device. Further, a method of searching a user and a device for setting the buddy relationship may be simplified.

What is claimed is:

1. A Consumer Electronic (CE) device of a first user for sharing contents using a messenger program, the CE device of the first user comprising a processor and a memory executing modules, the CE device of the first user further comprising:

a storage module configured to store device information of the CE device of the first user;

a communication module configured to transmit the stored device information of the CE device of the first user to a server and receive, from the server, a messenger account generated on the basis of the device information;

a display module configured to display a user device list and a buddy device list, wherein the user device list includes CE devices of the first user and the buddy device list includes CE devices of a second user different from the first user; and a control module configured to provide contents to a CE device of the second user among the buddy device list in response to a request for the contents, wherein the CE device of the first user has a first buddy relationship with a CE device of the CE devices of the first user, the first buddy relationship being set by using the messenger account in response to the CE device of the first user transmitting a buddy relationship request message to the CE device of the CE devices of the first user and receiving an acceptance message from the CE device of the CE devices of the first user, and wherein each of the CE devices of the first user has a second buddy relationship with each of the CE devices of the second user, the second buddy relationship being set in response to the first user requesting the second user for a buddy relationship and the second user accepting the request.

2. The Consumer Electronic (CE) device of the first user of claim 1, wherein the server is a device server, and the CE device of the first user is in conjunction with a messenger server, and the messenger server comprises:
a server module which registers the messenger account according to a messenger account registration request generated in the device server, and
a communication module which provides an acceptance or a rejection of a buddy relationship request in response to a buddy relationship being requested on the basis of the registered messenger account.

3. The Consumer Electronic (CE) device of the first user of claim 1, wherein the messenger program is an instant messenger program.

4. The Consumer Electronic (CE) device of the first user of claim 1, wherein the messenger account comprises at least one of a messenger ID, a password, and user setting information generated on the basis of the device information of the CE device of the first user.

* * * * *